(12) United States Patent
Lu et al.

(10) Patent No.: US 11,288,467 B2
(45) Date of Patent: Mar. 29, 2022

(54) WEARABLE NON-CONTACT COMMUNICATION DEVICE

(71) Applicant: Hong Kong R&D Centre for Logistics and Supply Chain Management Enabling Technologies Limited, Pok Fu Lam (HK)

(72) Inventors: Feng Lu, Pok Fu Lam (HK); Chi Lun Mak, Pok Fu Lam (HK); Jing Tian Xi, Pok Fu Lam (HK); Kwong Yeung Simon Wong, Pok Fu Lam (HK)

(73) Assignee: Hong Kong R&D Centre for Logistics and Supply Chain Management Enabling Technologies Limited, Pok Fu Lam (HK)

( * ) Notice: Subject to any disclaimer, the term of this patent is extended or adjusted under 35 U.S.C. 154(b) by 0 days.

(21) Appl. No.: 16/493,525

(22) PCT Filed: Mar. 15, 2017

(86) PCT No.: PCT/CN2017/076755
§ 371 (c)(1),
(2) Date: Sep. 12, 2019

(87) PCT Pub. No.: WO2018/165896
PCT Pub. Date: Sep. 20, 2018

(65) Prior Publication Data
US 2020/0034585 A1 Jan. 30, 2020

(51) Int. Cl.
*G06K 7/10* (2006.01)
*G06K 19/07* (2006.01)
*G06F 1/16* (2006.01)

(52) U.S. Cl.
CPC ..... *G06K 7/10366* (2013.01); *G06K 19/0723* (2013.01); *G06F 1/163* (2013.01)

(58) Field of Classification Search
CPC .................................. G06K 7/10366
USPC .......................................... 235/451
See application file for complete search history.

(56) References Cited

U.S. PATENT DOCUMENTS

| 8,646,695 | B2 | 2/2014 | Worrall | |
|---|---|---|---|---|
| 2004/0032377 | A1* | 2/2004 | Forster | B60C 23/0433 343/895 |
| 2006/0286972 | A1* | 12/2006 | Kates | H04M 1/05 455/415 |
| 2009/0309737 | A1* | 12/2009 | Bowles | A61B 5/0031 340/573.1 |
| 2014/0118201 | A1* | 5/2014 | Im | H01Q 1/2225 343/718 |

(Continued)

FOREIGN PATENT DOCUMENTS

| CN | 101017526 | 8/2007 |
|---|---|---|
| CN | 102487608 | 6/2012 |

(Continued)

*Primary Examiner* — Rafferty D Kelly
(74) *Attorney, Agent, or Firm* — Renner, Kenner, Greive, Bobak, Taylor & Weber

(57) ABSTRACT

A wearable non-contact communication device comprising a non-contact reader arranged to read an electronic marker and transmit information associated with the electronic marker to a user accessible device; wherein the reader includes a resilient antenna arranged to communicate with the electronic marker when the resilient antenna is engaged to the user.

14 Claims, 4 Drawing Sheets

(56) References Cited

U.S. PATENT DOCUMENTS

2015/0269802 A1* 9/2015 Acosta-Cazaubon ........................ G07C 13/00
      705/12

FOREIGN PATENT DOCUMENTS

| CN | 104766105 | 7/2015 |
| CN | 105046299 | 11/2015 |
| CN | 105144255 | 12/2015 |

* cited by examiner

WEARABLE NON-CONTACT COMMUNICATION DEVICE

TECHNICAL FIELD

The present invention relates generally to a communication device and a method for reading information using thereof and more particularly, although not exclusively, relates to a wearable non-contact communication device having a non-contact reader with an antenna to communicate with an electronic marker.

BACKGROUND

Non-contact communication technologies such as RFID and wireless are broadly applied across various industries. In a non-contact communication device, there is typically a reader and a tag. The reader further includes an antenna to communicate with the tag whilst the reader is operable to read the information stored in the tag. The reader, upon receiving the information from the tag, would transmit the information to a user accessible device for further processing.

Such non-contact communication technologies typically are commonly applied in logistic industry such as storages and airport check in systems. The reader is typically stationary and the tag is stuck onto the goods to be detected by the reader during the logistic arrangement to enable the communication between the reader and the tag.

The typically readers which exist in the market are not suitable to be implemented into location-based service for human beings. This is because the communication signals between the tag and reader is hampered by the presence of the interference of the human body.

SUMMARY OF THE INVENTION

To solve at least some of the above problems, the presently disclosed wearable non-contact communication device comprises a non-contact reader with a resilient antenna arranged to communicate with tags when the resilient antenna is engaged to the user.

In accordance with a first aspect of the present invention, there is provided a wearable non-contact communication device comprising: a non-contact reader arranged to read an electronic marker and transmit information associated with the electronic marker to a user accessible device; wherein the reader includes a resilient antenna arranged to communicate with the electronic marker when the resilient antenna is engaged to the user.

In one embodiment of the first aspect, the resilient antenna provides an optimized frequency band when the resilient antenna is stretched to engage the user.

In one embodiment of the first aspect, the stretched resilient antenna interacts with the dielectric of the user to provide the optimized frequency band.

In one embodiment of the first aspect, the frequency band of the resilient antenna varies with the shape or size thereof.

In one embodiment of the first aspect, the resilient antenna is made of elastic material or flexible substrate.

In one embodiment of the first aspect, the resilient antenna is embedded in elastic material or flexible substrate.

In one embodiment of the first aspect, at least part of the resilient antenna is formed by elastic material or flexible substrate.

In one embodiment of the first aspect, the resilient antenna comprises an elastic member.

In one embodiment of the first aspect, the elastic member is made of metallic material.

In one embodiment of the first aspect, the elastic member is molded by an elastic non-conductive housing.

In one embodiment of the first aspect, the resilient antenna is made of rubber.

In one embodiment of the first aspect, the non-contact reader is a wireless reader.

In one embodiment of the first aspect, the non-contact reader is a RFID reader.

In one embodiment of the first aspect, the electronic marker is a wireless tag.

In one embodiment of the first aspect, the electronic marker is a RFID tag.

In one embodiment of the first aspect, one of the non-contact reader and the electronic marker is passive.

In one embodiment of the first aspect, the resilient antenna communicates with the electronic marker within a desirable distance therefrom.

In one embodiment of the first aspect, the resilient antenna is in wireless communication with the electronic marker.

In one embodiment of the first aspect, the resilient antenna is arranged proximate to the lower limb of a user.

In one embodiment of the first aspect, the resilient antenna is wrapped about the leg of a user.

In one embodiment of the first aspect, the resilient antenna is wrapped about the foot of a user.

In one embodiment of the first aspect, the resilient antenna is wrapped about the shoes or sock of a user.

In one embodiment of the first aspect, the resilient antenna is embedded within the shoes or sock of a user.

In one embodiment of the first aspect, the transmitted information includes the current location of the marker.

In one embodiment of the first aspect, the electronic marker is arranged at low level.

In one embodiment of the first aspect, the electronic marker is arranged proximate to the ground.

In one embodiment of the first aspect, the reader is arranged proximate to the ground.

In one embodiment of the first aspect, the resilient antenna is adjacent to the reader.

In one embodiment of the first aspect, the resilient antenna is in wireless connection with the reader.

In one embodiment of the first aspect, the resilient antenna is coupled to the reader.

In one embodiment of the first aspect, the frequency band of the resilient antenna is prevented from interference with the frequency band of one or more identical resilient antennas.

In accordance with a second aspect of the present invention, there is provided a method for reading information using a wearable non-contact communication device comprising the steps of: reading an electronic marker by a non-contact reader and transmitting information associated with the electronic marker to a user accessible device; wherein the reader communicate with the electronic marker when a resilient antenna of the reader is engaged to the user.

In one embodiment of the second aspect, the resilient antenna provides an optimized frequency band when the resilient antenna is stretched to engage the user.

In one embodiment of the second aspect, the stretched resilient antenna interacts with the dielectric of the user to provide the optimized frequency band.

In one embodiment of the second aspect, the frequency band of the resilient antenna varies with the shape or size thereof.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
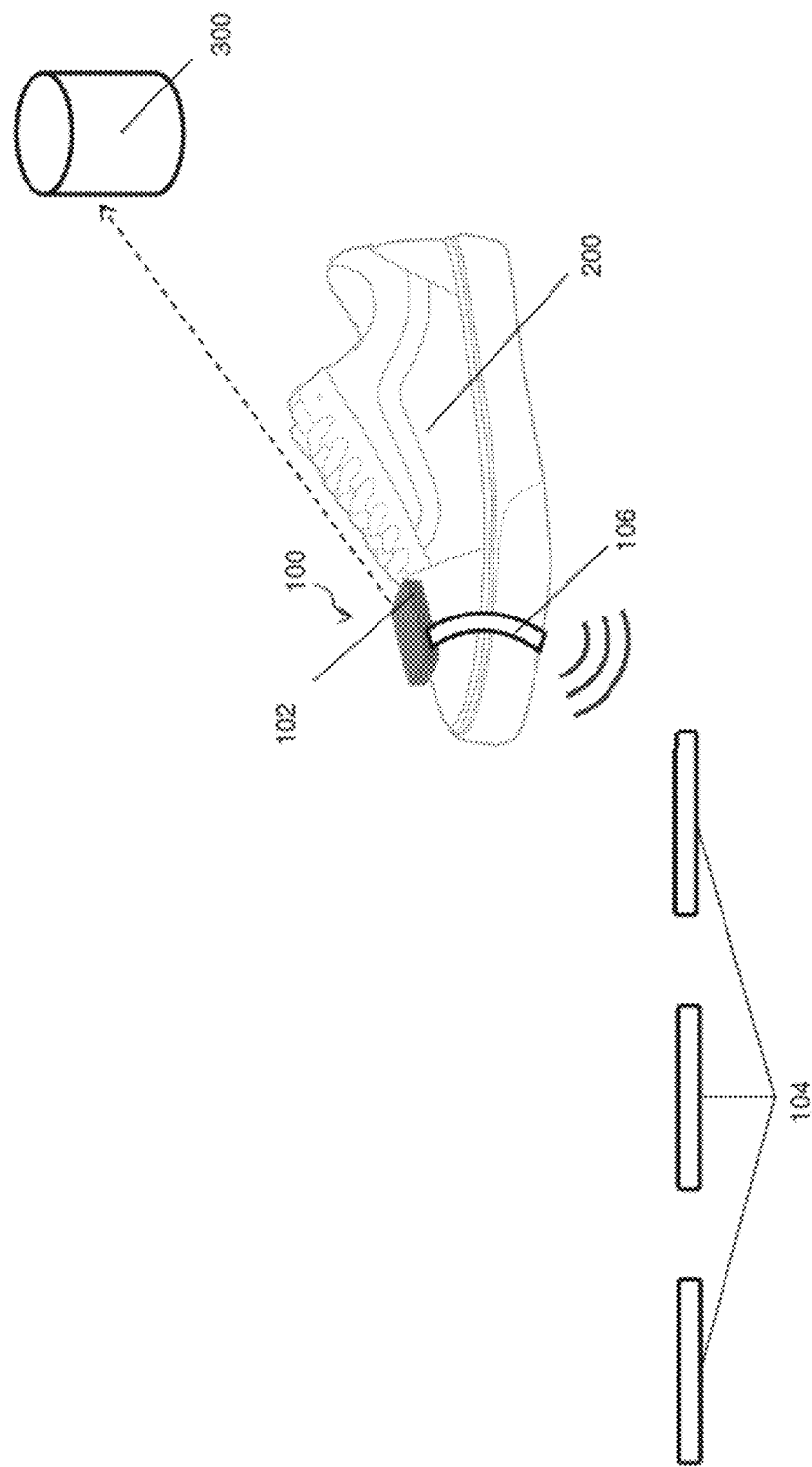
FIG. 1 illustrates an application of a wearable non-contact communication device in accordance with one embodiment of the present invention.

Referring to FIG. 1, there is provided a wearable non-contact communication device 100 comprising: a non-contact reader 102 arranged to read an electronic marker 104 and transmit information associated with the electronic marker 104 to a user accessible device 300; wherein the reader 102 includes a resilient antenna 106 arranged to communicate with the electronic marker 104 when the resilient antenna 106 is engaged to the user.

Figure 2:
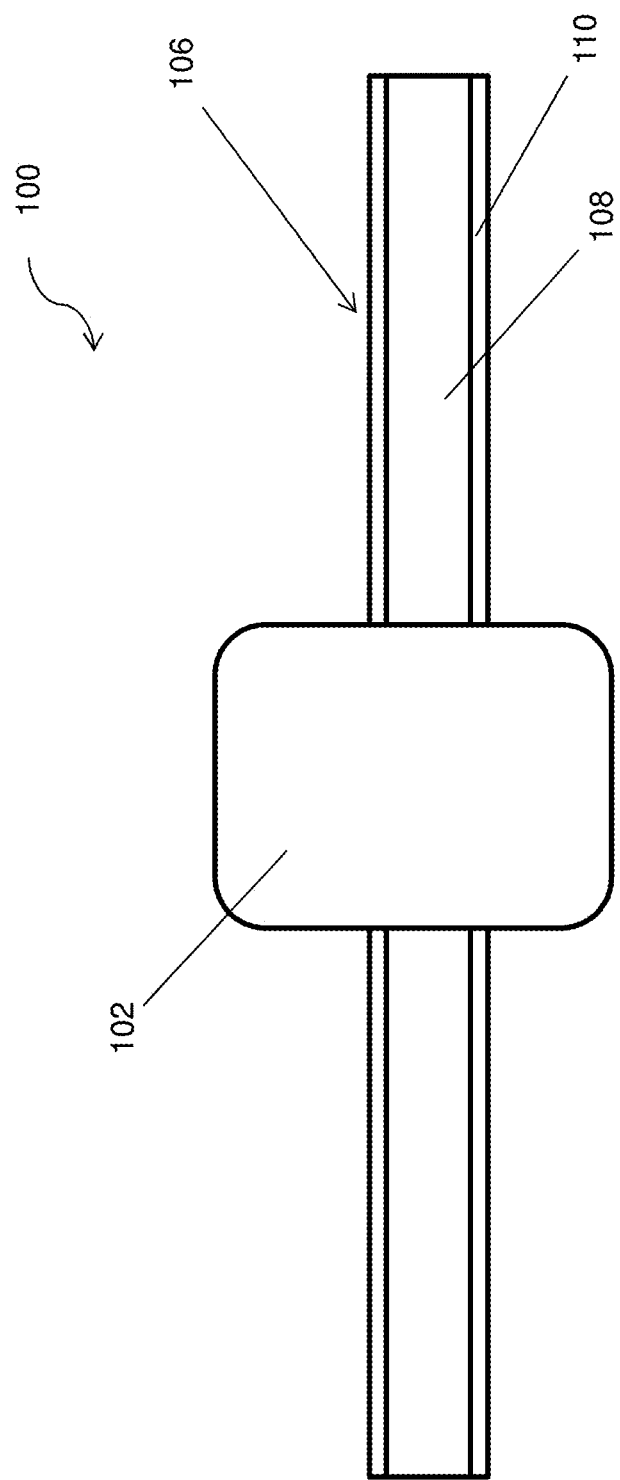
FIG. 2 shows a top view of the wearable non-contact communication device in accordance with one embodiment of the present invention.
Figure 3:
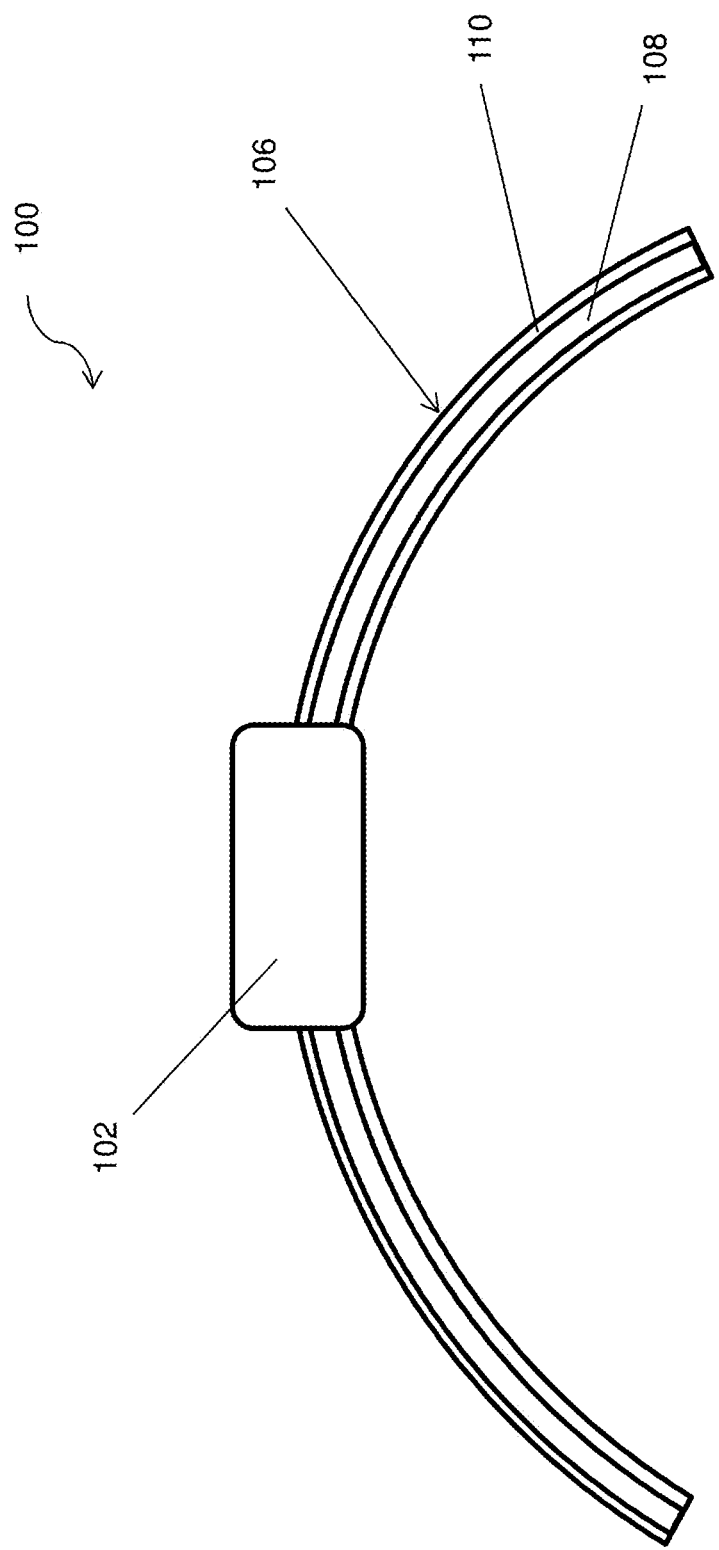
FIG. 3 shows a front view of the wearable non-contact communication device in accordance with one embodiment of the present invention.

FIGS. 1-3 show an embodiment of a wearable non-contact communication device 100 of the present invention. As shown in the Figures, the wearable non-contact communication device 100 includes a non-contact reader 102, a plurality of electronic markers 104 and a resilient antenna 106. The resilient antenna 106 is stretched to engage the shoes 200 worn by the user. The resilient antenna 106 may be stretched to different shape or size, depending on the shape or size of the shoes 200 to be worn on to provide an operating frequency band to communicate with other tags when the resilient antenna 106 is attached to the shoes or legs. The wearable non-contact communication device 100 may be wrapped around the shoes 200 in geometrical-plane as shown in FIG. 1, such that the wearable non-contact communication device 100 is portable without it being carried in hand.

Advantageously, the resilient antenna 106 is specially designed to accommodate the effect of the proximity of the shoes and human body. In the present embodiment, the stretched resilient antenna 106 varies with the shape or size of the shoes 200, and thereby providing an optimized frequency band to interact with the human dielectric of the user. It should be noted that the resilient antenna 106 will provide an operating frequency band regardless the shape or size of the shoes 200. The resilient antenna 106 also provides better range of coverage and for different shoe's form factor. This arrangement is particularly advantageous as the user may wish to attach the resilient antenna 106 to different shoes with varying surfaces.

A person skilled in the art would readily appreciate that present invention is capable of various modifications without departing from the fundamental arrangement of the resilient antenna 106. In other words, these arrangements can provide additional flexibility to the user in the selection of daily shoes wearing. For example, in some embodiments, the resilient antenna may be arranged proximate to the lower limb of a user. The resilient antenna may also be wrapped about the leg, foot, arm of a user. Furthermore, the resilient antenna may also be wrapped about or embedded within the shoes or sock of a user.

Referring again to FIG. 1, the electronic markers 104 may be wireless tags such as RFID tags, and the non-contact reader 102 may be a wireless reader such as RFID reader. As shown in FIG. 1, the electronic markers 104 are disposed around a premise and preferably at a low level proximate to the ground although they may also be placed off the ground. These electronic markers 104 may serve as floor tags in order to provide location information, for example guidance for user walking around airport premise. The electronic markers 104 are disposed at a low level proximate to the grounds thereby preventing from interfering hand level readers. In this example, a person skilled in the art would appreciate that the non-contact reader 102 may also includes any readers which can read the electronic markers 104 by positioning near or in contact with the electronic markers 104.

Preferably in the example embodiment, the electronic markers 104 may be passive RFID tags without any electric supply needed. However, a person skilled in the art would also appreciate that the non-contact reader 102 may also be passive RFID reader.

Preferably in the example embodiment, the user accessible device 300 may be smartphones, portable computers, wearable computing devices, tablets, PCs, laptops, servers. These devices may give navigated assistances through audible instructions or instructions in other forms, look up and make references to databases, store information online or cloud.

Referring now to FIG. 2, there is shown an example wearable non-contact communication device 100 includes a non-contact reader 102, a plurality of electronic markers 104 and a resilient antenna 106. In this example embodiment, the resilient antenna 106 further comprises an elastic member 108 (e.g. a thin meandering wire) and an elastic non-conductive housing 110, where the elastic member 108 is molded within the elastic non-conductive housing 110 so that the resilient antenna 106 may be conformal, low profiling, unobtrusive to the shoe's surface and bottom. Preferably, the elastic member 108 may be made of metallic material and the elastic non-conductive housing 110 of the resilient antenna 106 may be made of elastic material or flexible substrate such as rubber bands. A person skilled in the art would readily appreciate that present invention is capable of various modifications without departing from this fundamental resilient antenna principle. In some embodiments, the resilient antenna 106 may be embedded in elastic material or flexible substrate to form a single component.

Referring now to FIG. 3, there is shown an example wearable non-contact communication device 100 under stretching condition. The elastic member 108 of the resilient antenna 106, together with the elastic non-conductive housing 110, may be stretched into desire shape or size to be engaged with the shoes or wrapped directly about part of the user's body. Advantageously, the elastic member 108 and the elastic non-conductive housing 110 when stretched so as to engage to a user may provide an optimized frequency band to interact with the human dielectric of the user regardless the degree of stretching or the outcome shape, thereby allowing the wearable non-contact communication device 100 to accommodate the effect of the proximity of the shoes and/or human body. The communication signals between the resilient antenna 106 and an electronic marker 104 is dielectric-free.

In this example embodiment, the non-contact reader 102 is also arranged at low level proximate to the ground. This arrangement is advantageous to prevent or minimize the interference to the wireless communication between the non-contact reader 102, the electronic markers 104 and the resilient antenna 106. It would also be appreciate by person skilled in the art that the non-contact reader 102 should only read the closest electronic marker 104 by proximity sensing. The resilient antenna 106 is therefore arranged to only communicate with the electronic marker 104 within a desirable distance therefrom through wireless communication so as to eliminate any communication with the other electronic markers besides the closest electronic marker 104.

In this example embodiment, the resilient antenna 106 is coupled to the non-contact reader 102. A person skilled in the art would readily appreciate that present invention is capable of various modifications without departing from the fundamental functionality between the non-contact reader 102 and the resilient antenna 106. Optionally, the resilient antenna 106 may be in wireless connection with the non-contact reader 102.

Figure 4:
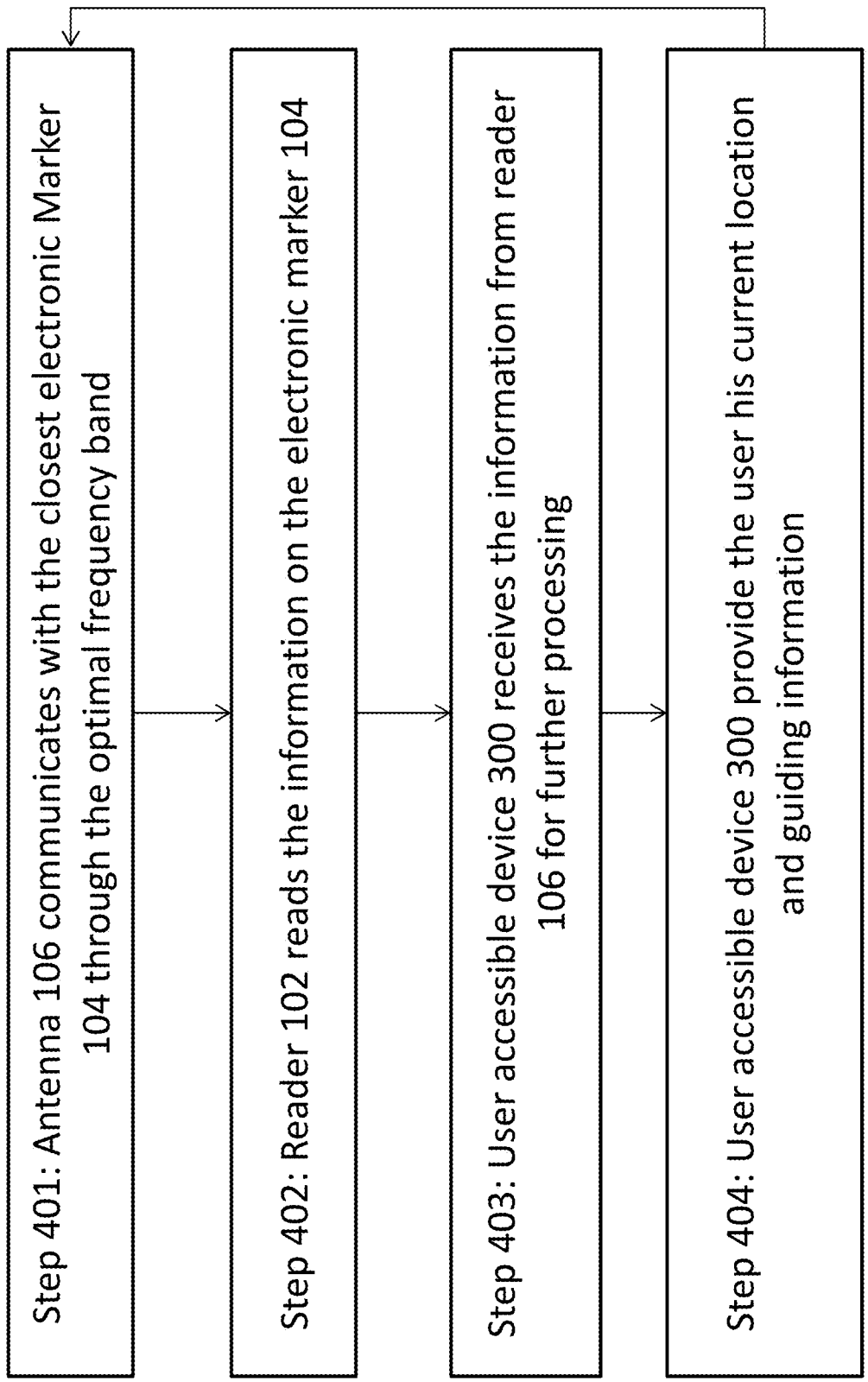
FIG. 4 shows a schematic diagram illustrating the application of the wearable non-contact communication device in accordance with one embodiment of the present invention.

Referring now to FIG. 4, there is shown an example method for operating the wearable non-contact communication device. In this example, during the operation, the resilient antenna 106 communicates with the closest electronic marker 104 within a desirable distance therefrom through an optimal frequency band, as shown in Step 401. The non-contact reader 102 may in turn read the closest electronic marker 104 through the optimal frequency band provided by the resilient antenna 106, as shown in Step 402. Upon reading the closest electronic marker 104, the non-contact reader 102 may transmit the information associated with the electronic marker to the user accessible device 300. The user accessible device 300 may further process the received information, as shown in Step 403 and thereby provide the user his current location and guiding information through a communicating means such as mobile device or audio system (not shown), as shown in Step 404. When the user moves around the premise, the wearable non-contact communication device 100 will repeat the same process from step 401 to 404 and keep updating the location information on the go based on the reading of the information of the next closest electronic marker 104, and the user accessible device 300 will provide a location based service through the communicating means.

In one example embodiment, the user may be a passenger who is awaiting his flight and hanging around the airport. When he moves around the departure floor with the wearable non-contact communication device 100 attached to his shoes, the resilient antenna 106 interacts with the electronic marker 104 disposed around the airport from time to time, such that the non-contact reader 102 may transmit the current location information of the passenger to the user accessible device 300 from time to time. For example, the passenger would like to reach a desired destination in his mind, such as check-in counter, boarding gate, restaurants, shops, and the closest toilet from his current position or the like. With the live location information from the wearable non-contact communication device 100, the user accessible device 300 may provide graphical or audible live instructions to the passenger until he reaches the desired destination.

In a further example embodiment, the user may activate or deactivate the wearable non-contact communication device 100 anytime. In this example, the stretching and squeezing of the resilient antenna 106 may serve as an activating and deactivating mechanism of the wearable non-contact communication device 100. For example, when the resilient antenna 106 is stretched to engage to a user, the non-contact reader 102 may communicate with the electronic markers 104 through the optimal frequency, thereby activating the wearable non-contact communication device 100 for guiding purposes. In turn, when the user reaches the destination or desired region and no longer need the guiding functions, the resilient antenna 106 may be detached from the user to terminate the communication between the non-contact reader 102 and the electronic markers 104 or changing the operating frequency away from the optimal range, thereby deactivating the wearable non-contact communication device 100 and its guiding operations. The wearable non-contact communication device 100 may then be squeezed into the hand luggage or hand held by the user. In another example embodiment, the Airport Authority may further utilise the location information of the individual passengers, such that if the flight is going to take off in 20 minutes and the passenger is yet to proceed to the boarding gate, the airport service crew may trace the position of the missing passenger and reach the passenger more proactively.

It should be noted that the wearable non-contact communication device 100 may be used extensively. For example, a plurality of wearable non-contact communication device 100 may be wrapped around the shoes 200 simultaneously. Advantageously, each identical non-contact reader may read different types of electronics markers through their unique frequency band of the identical resilient antennas. The frequency band of each of the resilient antenna is prevented from interference with the frequency band of one or more identical resilient antennas, thereby allowing each wearable non-contact communication device 100 to function individually. Each non-contact reader 102 of the wearable non-contact communication device 100 may then transmit the information associated with the various electronic markers to one or more user accessible device 300 for further processing and provide the user various guidance.

It will be appreciated by persons skilled in the art that although the embodiments comprising the wearable non-contact communication device 100 are related to providing location based service, these embodiments may be applied in any other applications such as outdoor gaming, logistics, food and beverage ordering with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A wearable non-contact communication device comprising:
   an RFID reader arranged to be worn by a user at a low level proximate to the ground, to read an RFID tag arranged at a low level proximate to the ground, and to transmit location information associated with the RFID tag to a user accessible device; and
   a resilient antenna coupled to the RFID reader arranged to enable a communication between the RFID reader and the RFID tag by proximity sensing, wherein the resilient antenna comprises a meandering wire molded within an elastic non-conductive housing such that the resilient antenna is conformal; wherein the elastic non-conductive housing is made of a rubber band arranged to be stretched to engage a shoe worn by the user by wrapping around the shoe, wherein the RFID reader is arranged to communicate with the RFID tag through an optimal frequency band when the resilient antenna is stretched to a first dimension in which the rubber band and the RFID reader wrap around the shoe so as to activate the wearable non-contact communication device; and wherein the wearable non-contact communication device is deactivated when the resilient antenna is not stretched or in a second dimension, wherein the second dimension is different from the first dimension.

2. The wearable non-contact communication device according to claim 1, wherein the stretched resilient antenna interacts with the dielectric of the user to provide the optimized frequency band.

3. The wearable non-contact communication device according to claim 1, wherein the meandering wire is an elastic member.

4. The wearable non-contact communication device according to claim 3, wherein the meandering wire is made of a metallic material.

5. The wearable non-contact communication device according to claim 1, wherein one of the RFID reader and the RFID tag is passive.

6. The wearable non-contact communication device according to claim 1, wherein the resilient antenna communicates with the RFID tag within a desirable distance therefrom.

7. The wearable non-contact communication device according to claim 6, wherein the resilient antenna is in wireless communication with the RFID tag.

8. The wearable non-contact communication device according to claim 1, wherein the resilient antenna is further arranged to be wrapped about a leg of the user.

9. The wearable non-contact communication device according to claim 1, wherein the location information includes the current location of the RFID tag.

10. The wearable non-contact communication device according to claim 1, wherein the resilient antenna is adjacent to the RFID reader.

11. The wearable non-contact communication device according to claim 1, wherein the frequency band of the resilient antenna is prevented from interference with the frequency band of one or more identical resilient antennas.

12. A method for reading location information using a wearable non-contact communication device comprising the steps of:
providing the wearable non-contact communication device comprising an RFID reader and a resilient antenna coupled to the RFID reader, wherein the resilient antenna comprises a meandering wire molded within an elastic non-conductive housing so that the resilient antenna is conformal, and the elastic non-conductive housing is made of rubber band arranged to be stretched to engage a shoe worn by a user by wrapping around the shoe, and wherein the resilient antenna is arranged to enable a communication between the RFID reader and an RFID tag;
stretching the resilient antenna to a first dimension in which the rubber band and the RFID reader wrap around the shoe, so as to activate the wearable non-contact communication device:
reading the RFID tag arranged at a low level proximate to the ground by the RFID reader worn by a user at a low level proximate to the ground by proximity sensing, wherein the RFID reader is arranged to communicate with the RFID tag through an optimal frequency band when the resilient antenna is stretched to the first dimension; and
transmitting location information associated with the RFID tag to a user accessible device, wherein the wearable non-contact communication device is deactivated when the resilient antenna is not stretched or in a second dimension, wherein the second dimension is different from the first dimension.

13. The method according to claim 12, further comprising the step of detaching the resilient antenna from the user to terminate the communication between the RFID reader and the RFID tag.

14. The method according to claim 2, wherein the stretched resilient antenna interacts with the dielectric of the user to provide the optimized frequency band.

* * * * *